United States Patent
Beason et al.

(10) Patent No.: US 6,862,525 B1
(45) Date of Patent: Mar. 1, 2005

(54) GPS DEVICE WITH COMPASS AND ALTIMETER AND METHOD FOR DISPLAYING NAVIGATION INFORMATION

(75) Inventors: Lawrence W. Beason, Olathe, KS (US); David J. Laverick, Overland Park, KS (US); Tracy Olivier, Olathe, KS (US); Scott Burgett, Overland Park, KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 10/812,755

(22) Filed: Mar. 29, 2004

Related U.S. Application Data

(63) Continuation of application No. 10/361,531, filed on Feb. 10, 2003, which is a continuation of application No. 09/431,735, filed on Nov. 1, 1999, now Pat. No. 6,529,827.

(51) Int. Cl.$^7$ .............................................. G01C 21/00
(52) U.S. Cl. ...................................................... 701/213
(58) Field of Search ................................ 701/200–201, 701/211, 213, 214; 340/988

(56) References Cited

U.S. PATENT DOCUMENTS

| | | | |
|---|---|---|---|
| 5,075,693 A | * 12/1991 | McMillan et al. ........... 342/457 |
| 5,146,231 A | 9/1992 | Ghaem et al. ............... 342/419 |
| 5,266,958 A | 11/1993 | Durboraw, III ............. 342/357 |
| 5,572,217 A | 11/1996 | Flawn ......................... 342/357 |
| 5,583,776 A | 12/1996 | Levi et al. ................... 364/450 |
| 5,646,857 A | 7/1997 | McBurney et al. ...... 364/449.7 |
| 5,745,054 A | 4/1998 | Wilkens ...................... 340/972 |
| 5,820,080 A | 10/1998 | Eschenbach ................. 244/183 |
| 5,955,973 A | 9/1999 | Anderson .................... 340/988 |
| 6,067,046 A | 5/2000 | Nichols .................. 342/357.14 |
| 6,188,956 B1 | 2/2001 | Walters ....................... 701/200 |
| 6,222,485 B1 | 4/2001 | Walters et al. .......... 342/357.13 |
| 6,459,990 B1 * | 10/2002 | McCall et al. .............. 701/220 |

* cited by examiner

*Primary Examiner*—Yonel Beaulieu
(74) *Attorney, Agent, or Firm*—Devon A. Rolf

(57) ABSTRACT

A portable, handheld electronic navigation device includes an altimeter, a compass, and a GPS unit. An internal memory stores cartographic data, for displaying the cartographic data on a display of the navigation device. Accordingly, the device is capable of displaying cartographic data surrounding a location of the unit as determined by the altimeter. Additionally, through operation of an input, a user can cause the display to move, and thus display additional cartographic information, in the direction of the compass heading even when the user of the device is standing still. Furthermore, through utilization of a clock, such as the GPS clock, a user can determine altitude changes over time. Also, the altimeter of the navigation may be calibrated with altitude information entered by a user, with altitude information obtained from the cartographic or with altitude information derived from GPS.

22 Claims, 3 Drawing Sheets

GPS DEVICE WITH COMPASS AND ALTIMETER AND METHOD FOR DISPLAYING NAVIGATION INFORMATION

This application is a continuation of application Ser. No. 10/361,531, filed Feb. 10, 2003, which is a continuation of Ser. No. 09/431,735, filed Nov. 1, 1999, now U.S. Pat. No. 6,529,827.

BACKGROUND OF THE INVENTION

1. Field of the Invention

The present invention is directed to an electronic navigation device. More particularly, the present invention is directed to a handheld electronic navigation device, having combined in a single handheld housing a GPS unit, an electronic compass, and an altimeter.

2. Description of the Related Art

Handheld navigation devices are well known, widely used, and are becoming increasingly popular. For example, GPS units, which have the ability to calculate a position and display map, route, and location information are becoming increasingly popular. Conventional GPS units also have the ability to calculate a user's heading, or direction of travel, by determining the movement of a user over time. However, conventional GPS units are unable to determine heading or direction information when the user of the GPS device is not traveling at a sufficient speed, typically in the order of 4 mph or greater.

Accordingly, an outdoor enthusiast (such as a hiker or biker), being often at a standstill or traveling less than a sufficient speed, must typically carry additional instruments, such as a compass, in order to instantaneously determine direction or heading information. Furthermore, it is often additionally desired by such enthusiasts to have knowledge of altitude information. Retaining this information requires yet an additional instrument, such as an altimeter. Carrying multiple such devices is particularly cumbersome when hiking or biking.

In an attempt to overcome the foregoing, one available product combines a GPS unit and a barometric pressure sensor in the same housing. However, the pressure sensor is used only to augment GPS derived altitude information, not as a separate indicator of altitude. Another available product, the XL1000 by SILVA combines a GPS unit and an electronic compass, but not an altimeter.

Additionally, it would be desirable in a navigation unit to include extensive mapping information, and provision for uploading even additional map information as desired. Furthermore, it would be desirable for any such unit to have convenient options for calibrating the altimeter. In this regard, it is well known to calibrate an altimeter with known altitude information input by a user. It is also known, such as in a product known as the "Freestyle Altimeter Watch", to permit storage in a memory of two known altitudes, such that when a user is in one of the two locations, the correspondingly stored altitude information may be recalled for calibrating the altimeter. While useful, this approach is limited to a pair of locations and, as with other known approaches, requires user input.

Accordingly, the need exists for an improved navigation unit. Particularly, the need exists for a portable navigation unit having GPS, compass, and altimeter outputs. The present invention fills the foregoing identified needs, and other needs, while overcoming the drawbacks of the prior art.

SUMMARY OF THE INVENTION

It is an object of the present invention to provide an improved navigation unit.

It is an object of the present invention to combine prior art navigation units of various types into a single unit capable of individually or simultaneously displaying navigation information for a variety of types of single display.

It is a further object of the invention to provide unique options for calibrating an altimeter.

These and other objects are achieved by a portable, handheld navigation unit having an internal processor. Connected to the processor are, at a minimum, an input (such as a keypad), a display, a memory, a tilt sensor, magnetic sensor, a barometric pressure sensor, and a GPS receiver, which also connects to an antenna, such as a GPS patch antenna. These components, along with a power supply (such as batteries) are housed within a plastic housing sized to be handheld. As will be understood and appreciated, the input and display are accessible at an exterior of the housing, in a conventional manner.

The navigation device of the present invention serves as a GPS unit, in that GPS signals from a plurality of satellites may be received by the GPS receiver, such that the processor calculates position information based upon the received signals. Additionally, map information stored in memory may be retrieved and displayed on the display along with the calculated position information. Additionally, as will be understood and appreciated, the memory may include stored route, forward path, or backward path information, which may be recalled for display on the display. The conventional use and operation of GPS units is well known, and need not be further described.

Additionally, the navigation device of the present invention serves as an altimeter. In particular, the barometric pressure sensor measures barometric pressure and provides the sensed barometric pressure information to the processor. The processor, utilizing stored software, then converts the measured pressure into an altitude, which may be displayed to the user on the display. The conversion of barometric pressure to altitude may be accomplished in any desired and conventional manner. For example, a lookup table may be provided in the memory, where the table contains altitude information corresponding to known barometric pressures. Thus, an altitude corresponding with a sensed barometric pressure may be retrieved from memory and displayed on the display. Alternatively, the preferably, altitude (or elevation) may be calculated using a known equation.

Because barometric pressure in a particular area changes with changing weather, it is necessary for the navigation device of the present invention to be periodically calibrated. In accordance with an aspect of the invention, calibration is accomplished by supplying a known altitude in a particular area to the instrument software so that a correction factor correlating current pressure to known altitude can be generated. In the absence of such a calibration, any change in pressure will be perceived by the processor as a change in altitude, even if it is the result of a change in weather (such as a cold front passing through the particular area in which the device is being used).

In accordance with the principles of the present invention, there are three manners in which the known altitude can be supplied to the instrument software of the navigation device of the present invention for calibration purposes. The first manner of calibration involves calibration by the user. In this case, the user of the navigation device places the device into a calibration mode utilizing the input, and enters the current, known altitude. The processor then generates a correction factor corresponding to the entered altitude information.

In the absence of user input data, the instrument software of the navigation device of the present invention may obtain altitude information from a topographical map stored in the memory and/or displayed on the display. When this manner of calibration is utilized, the GPS unit has acquired a sufficient number of satellite signals, and has determined a position of the device. A map corresponding to the area in which the navigation device is being used, is retrieved from memory and displayed on the display. Thus, with knowledge of the position of the GPS unit relative to the stored topographical map, the altitude is determined since that information is provided in the topographical map information.

In the event a topographical map is not stored in memory and/or displayed on the display of the navigation device (or in the event altitude information corresponding to the location of the unit is not stored in memory), and the user has not entered an altitude using the input of the device, the necessary correction factor can be calculated by the processor using GPS-derived altitude. In this regard, and as will be readily appreciated, the position of a GPS unit in three dimensions may be determined when at least four satellite signals are received and processed. While GPS-derived altitude will typically not be as accurate as the input of the known altitude, or even as accurate as that provided on a topographical map, GPS does nevertheless provide a fairly accurate method of calibrating the navigation device. In particular, using GPS-derived altitude allows for complete "auto-calibration" of the navigation device, thus relieving the user of retrieving and/or displaying topographical map information or inputting a known altitude.

In accordance with an additional aspect of the present invention, the processor determines a difference between an altitude derived from barometric pressure information and a GPS derived altitude. When that difference is greater than a preselected amount, the processor determines that there has been no user input data entered, or that the user input data that has been entered is inaccurate, thus causing the processor to either (a) notify the user of the inaccuracy, or (b) rely upon topographical map information in the event it has been retrieved or displayed, or lastly rely upon GPS-derived altitude information in the absence of topographical map information.

Additionally, the presence of pressure sensor information and topographical maps permits the processor to determine vertical ascent/descent over a specified time period, rates of ascent/descent as the user travels or moves, as well as elevational profiles of user-selected routes stored in memory. Such information will be particularly useful to an individual, such as a hiker, biker, or hunter, in evaluating whether his or her intended path is too strenuous, or too easy, for his or her intended excursion.

As stated, the unique navigation device of the present invention also includes a compass. In accordance with the principals of the present invention, compass information is provided through a three-axis magnetic sensor and a two-axis tilt sensor. The three-axis magnetic sensor measures the strength of the earth magnetic field in each of the x, y, and z directions at the location of the navigation device, while the two-axis tilt sensor measures the orientation of the unit in pitch and roll as referenced to a known reference, such as the gravity vector (locally leveled tangent plane). The processor, and particularly the instrument software utilized by the present invention, takes this information and calculates a heading based upon the sensed magnetic field strengths and tilt information. This tilt information is used to reference the magnetic field data back to a level platform, so that accurate headings can be obtained. In this regard, as will be appreciated, without knowledge of tilt, the sensed x and y axis magnetic information cannot be transformed back to a level orientation. In order for accurate headings to be computed, the x and y sensor information must be referenced to a frame that is level, or at least substantially level, with the earth's surface at the location of the navigation device. The transformation of the sensed magnetic field strengths and tilt information to a heading is accomplished in a conventional manner, such as set forth in "3-D Vector Processing of Magnetometer and Inclinometer Data", by David Gibson *Cave and Karst Science*", Vol. 23, No. 2, October, 1996, pages 71–76; White Paper. "Nongimbaled Solid-State Compass" by Olson et al., Honeywell Technology Center, Minneapolis, Minn.; and "Aerospace Avionics Systems: A Modern Synthesis" by George Siouris, Academic Press, 1993, page 35, each of which is incorporated herein by reference.

The addition of the magnetic and tilt sensors utilized by the present invention allows for a compass setting to be displayed at any time, with the unit in a wide variety of orientations, even when the user is standing still and moving at a slow speed. The addition of these sensors also allows for a moving map display to be realized when the user is standing still. In this regard, conventional GPS navigational devices already provide moving map displays, but only when the unit is in motion and the GPS heading information is available. Thus, it will be appreciated that, with the present invention, even when a user is standing still, a heading may be determined, and that heading may be utilized to "scroll" the map display in a direction relative to the heading.

Accordingly, the present invention provides a unique navigation device which combines data from a plurality of sensors and position information obtained from GPS, and thus provides the user with a single unit that houses most, if not all, of the functions typically desired (or required) for land-based navigation. Additionally, as stated, the simultaneous access to GPS information, compass information, altimeter information, and topographical map data allows for features such as route elevation profiles and moving maps, even when the user is standing still (or moving slowly).

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
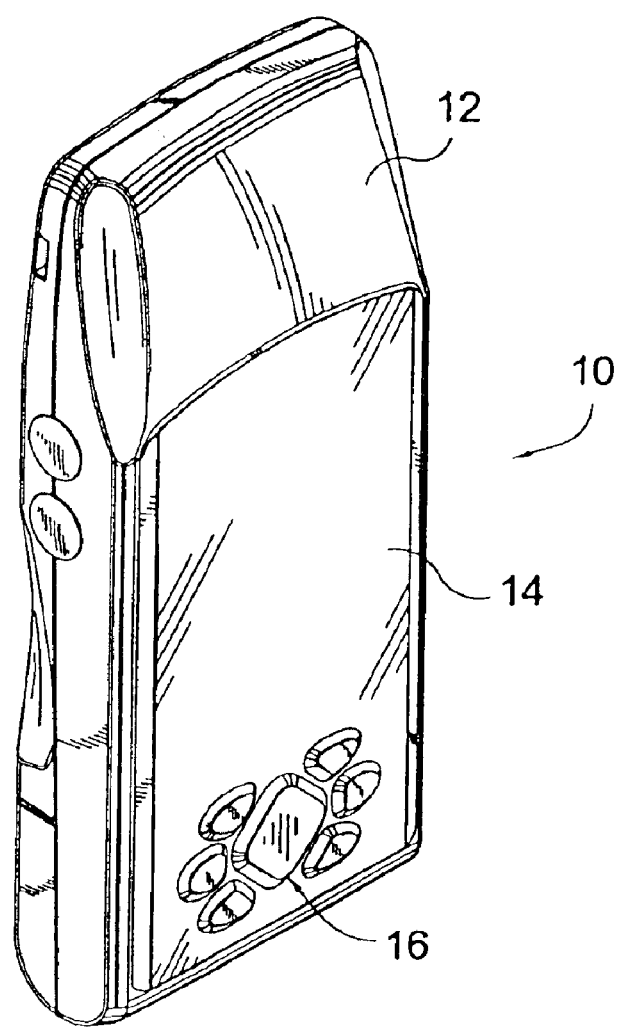
FIG. 1 is a perspective view of the preferred embodiment of a navigation of the present invention.

With reference to FIG. 1, a navigation device of the present invention is denoted generally by reference numeral 10. Navigation device 10 has a housing 12, preferably formed of plastic, a display 14, and an input 16, preferably a keypad input. Other known inputs, such as a touch screen, may be utilized additionally or alternatively. The housing 12 is preferably sized to be portable and handheld, and to fit at least substantially fit within the palm of a single hand of a user.

Figure 2:
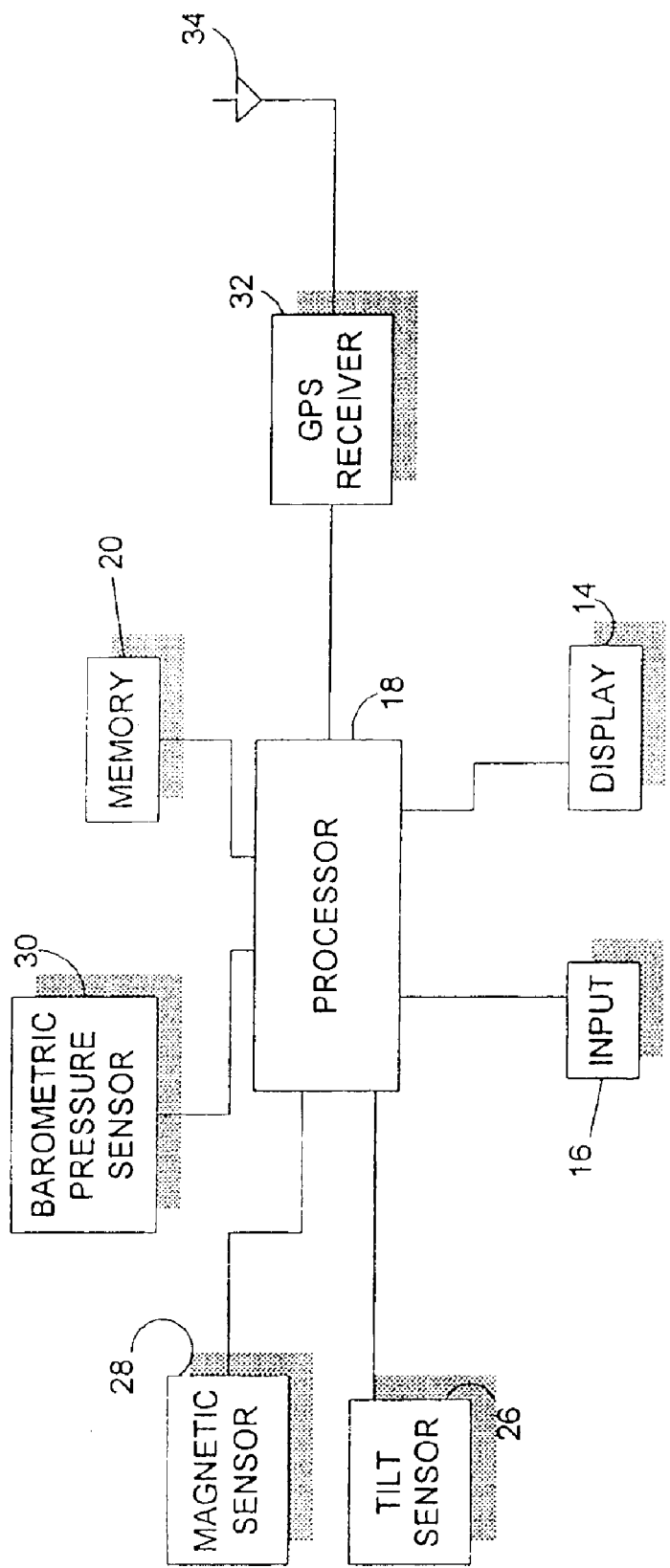
FIG. 2 is a block diagram of the navigation device of the present invention.

With reference to FIG. 2, navigation device 10 has a processor 18. Connected to processor 18 are a memory 20, the display 14, the input 16, a two-axis tilt sensor 26, a three-axis magnetic sensor 28, and a barometric pressure sensor 30. Additionally, a GPS receiver 32 is connected to the processor 18. An antenna, such as a GPS patch antenna for receiving GPS signals 34 is connected to the GPS receiver 32. A power source, such as batteries, or a battery pack (not shown), will be utilized to supply power to the various electronic components. Additionally, navigation device 10 may include a port, such as serial data port, for connecting the device 10 to a remote processor or personal computer for uploading information (such as map information) to the device 10, or for downloading information (such as route information) to a remote processor or personal computer. As will be understood and appreciated, the various electronic components are housed within the housing 12, such that display 14 and keypad input 16 are accessible at an exterior of the housing.

In use, navigation device 10 operates, in accordance with the principles of the invention, as a combined GPS unit, altimeter unit, and compass unit. In this regard, a user of navigation device 10 may carry the device on his or her person, such as in a pocket or holder attached to an article of clothing.

Figure 3:
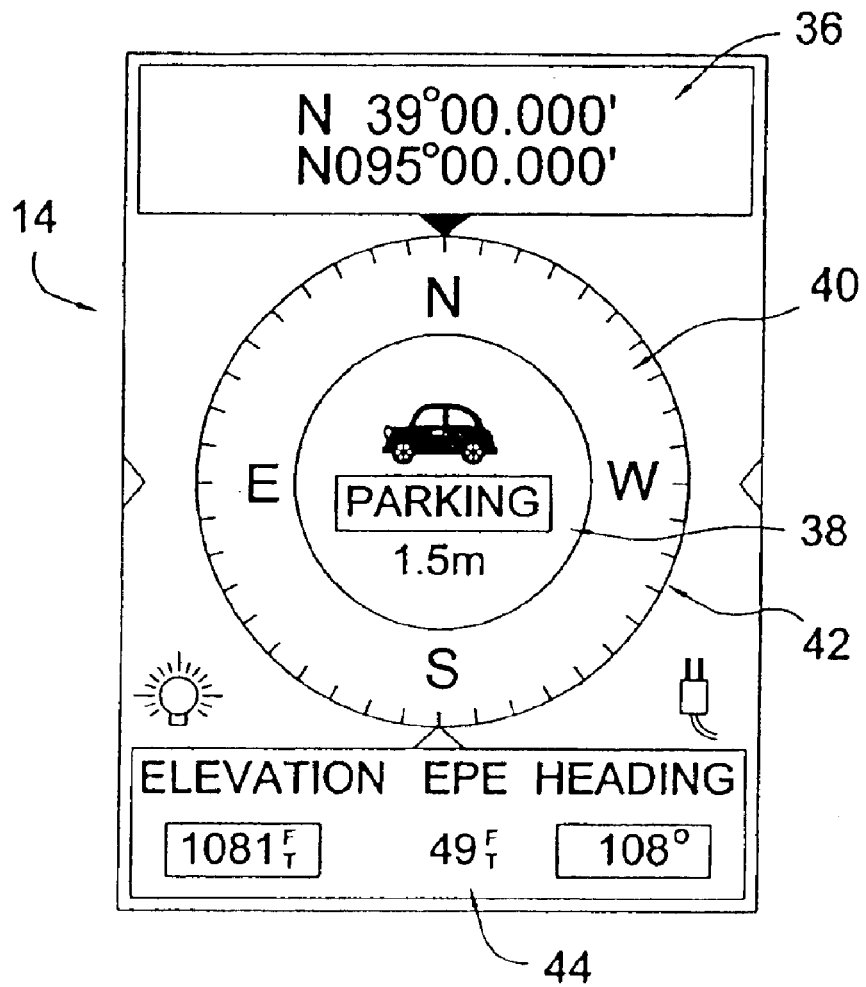
FIG. 3 is an illustrative view of a display, of the navigation device of the present invention, displaying topographical map data, GPS information, compass information, and altitude information.

In particular, and as illustrated in FIG. 3, the display 14 of navigation device 10 provides useful navigation information to the user. In particular, the display 14 of navigation device is capable of providing, either individually or simultaneously (as shown), GPS information, compass information, and altimeter information. Particularly, as illustrated in FIG. 3, the display 14 provides GPS information, such as latitude/longitude information, denoted generally by reference numeral 36. It will be understood that this GPS information is obtained in a conventional manner, such as by the GPS functions of the navigation unit determining the location of the unit. The processor then transmits to the display data indicative of the present location. Although not shown, it should be understood that the navigation device 10 is also capable of displaying cartographic data (e.g., data indicative of a map). In this regard, the memory 20 stores cartographic data, and the GPS unit may be operated to display cartographic data in proximity to the determined current location of the device. As will be further appreciated, in such an instance, an icon indicative of the location of the unit on the map may be displayed. As illustrated in FIG. 3, data indicative of an upcoming way point is illustrated, as indicated by reference numeral 38. In this regard, the navigation unit permits entry of way points in a conventional manner and, by determining the location of the unit, the processor 18 can also determine the distance to an upcoming way point. In the example provided, the upcoming way point is a parking structure, and is indicated to be 1.5 miles from the current position of the navigation unit.

Additionally, in accordance with an aspect of the invention, the display 14 of navigation unit 10 may provide compass information. As illustrated, a compass rose 40 is displayed on the display 14. Additionally, data indicative of compass information, determined as described above, is transmitted by the processor to display 14. As illustrated, the compass rose 40 includes a heading indicator 42 as well as a display window indicating the heading. As illustrated, the heading in this example is 108°. It should be understood and appreciated that the manner of displaying compass information may be varied. For example, the compass rose may be stationary, such that only the heading indicator changes. Alternatively, the compass rose may rotate such that the north ("N") rotates to always point north. Additionally, like the GPS information, the compass information changes as the user moves.

Additionally, altitude information obtained from the altimeter functionality of the present invention is displayed on display 14. In particular, FIG. 3 illustrates that the altitude, or "elevation" as it is illustrated, is 1,081 feet. Data indicative of the elevation (e.g., 1,081 feet) is transmitted to the display 14 by processor 18, after the elevation is determined by the altimeter incorporated in the navigation unit 10.

The navigation unit 10 also provides an estimated position error, designated generally by reference numeral 44 and denoted as "EPE", which indicates the estimated GPS error. Other conventionally displayed features may also be displayed on display 14.

In accordance with a particular aspect of the present invention, the navigation unit 10 permits a moving display, even when the navigation unit 10 is still. In this regard, once compass information is determined, a user can manipulate keypad 16 to simulate movement in the direction of the obtained compass heading. Such an input by the user is sensed by the processor 18, the processor retrieves cartographic data from memory 20 corresponding to the geographic area of the simulated movement. The retrieved cartographic data is transmitted to the display for display. This feature is particularly useful for outdoor enthusiasts, such as bikers, hikers, campers, hunters, and those who enjoy fishing, because it permits the user to obtain a visual indication of upcoming features or terrains without having to actually move in that direction.

Additionally, as described above, the navigation unit 10 of the present invention provides a calibration feature, which permits altitude calibration, and more particularly, calibration of the barometric pressure sensor 30. In particular, there are three ways in which the barometric pressure sensor 30 may be calibrated. The first manner of calibration involves calibration by the user. In short, the user of the navigation device, utilizing keypad 16, places the unit in calibration mode, and enters a known altitude. The processor 18 then generates a correction factor corresponding to the entered altitude information. That correction factor is then continuously applied to sensed measurements of the barometric pressure sensor 30.

Alternatively, in the absence of user input data, the navigation device of the present invention may obtain altitude information from a topographical map stored in the memory. Preferably, in the absence of user input data, the processor will retrieve from memory cartographic data corresponding to the location of the navigation unit (as determined by GPS), and di splay that retrieved data on the display. From the retrieved data, which includes altitude information, the processor learns the altitude of the then current location of the GPS unit. If the retrieved altitude differs from the altitude inform ation determined through utilization of the barometric pressure sensor, the processor computes a correction factor based upon that difference.

Finally, in the event a topographic map is not stored in memory and/or displayed on the display of the navigation device 10, and the user has not entered an altitude using the input 16 of the navigation device 10, the necessary correction factor can be calculated by the processor using GPS-derived altitude. As stated, and as will be readily appreciated, the position of a GPS unit in three dimensions (including altitude or elevation) may be determined when at least four satellite signals are received and processed. Thus, utilizing GPS-derived altitude, which is obtained in a conventional manner, the processor can compute a correction factor if there is a difference between the CPS-derived altitude and that which has been determined from use of the barometric pressure sensor. In a preferred embodiment of the present invention, the correction factor is computed (no matter which calibration method is utilized) only when the altitude or elevation as determined from the barometric pressure sensor information and that which has been entered utilizing one of the methods differs by a selected amount.

In particular, as is well known, for altitudes below 11,000 meters, the following equation is used to compute altitude from pressure.

where the following quantities are defined in the 1993 ICAO Standard Atmosphere Model:

$T_0$=Standard Temperature at Sea Level
L=Lapse Rate
R=Gas Constant
G=Acceleration of Gravity
$P_L$=Local Pressure (measured by barometer)
$P_B$=Base Pressure (in this case pressure at sea level)
$H_L$=Local Pressure Altitude The actual process of calibrating the altimeter may be accomplished with conventional pressure-offset techniques based upon a difference between the altitude calculation in the equation and the altitude calculated in one of the foregoing described manners.

In accordance with an additional aspect of the present invention, the processor "favors", or defaults to, altitude calibration information, input by the user. However, the processor periodically compares sensed altitude information, as corrected based upon user input, with GPS derived altitude. When that difference is greater than a preselected amount, the processor determines that there has been no user input data entered, or that the user input data that has been entered is inaccurate, thus causing the processor to (a) either transmit a signal to the display for indicating the discrepancy and allowing the user to choose to change altitude calibration sources to altitude information obtained from topographical map information or GPS, or to maintain the readout based upon user entered information or (b) automatically rely upon topographical map information in the event it has been retrieved or displayed (and if not, to rely on GPS-derived altitude). In particular, when altitude information is entered by a user for storage in memory 20, the processor, utilizing an internal clock, determines the time the altitude information was entered. Alternatively, a time of initial calibration may be maintained and stored in memory 20. In accordance with an aspect of the invention, when the processor determines that the difference between the altitude based upon a barometric pressure reading from sensor 30 and GPS derived altitude differs by a selected threshold amount, the processor first determines how long it has been since either (a) the altitude information was entered by the user or (b) the initial calibration was made, depending upon the preferred embodiment. If that time duration is longer than a selected time duration, then the processor will not provide the option, indicated above, of allowing the user to select a method for calculating altitude. Rather, the processor will automatically choose to retrieve that information from topographical map data, if present, and lastly, the processor will rely upon GPS-derived altitude information. In this manner, the processor essentially takes into account altitude information that a user may have entered before more recent weather changes occurred.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A navigation device comprising:
    a memory for storing cartographic information, including altitude information;
    an input for receiving indication from a user of a first location and a second location;
    a processor for creating an elevation profile of changes in elevation between the first location and the second location based upon the cartographic information without requiring the user to move between the first and second locations; and
    a display for displaying the elevation profile.

2. The navigation device as set forth in claim 1, further including a GPS receiver for determining a current location of the navigation device, wherein the current location of the navigation device is used as the first location.

3. The navigation device as set forth in claim 1, further including an altimeter for determining a current altitude of the navigation device.

4. The navigation device as set forth in claim 1, further including a three-axis magnetic sensor for providing compass information to the processor.

5. The navigation device as set forth in claim 4, further including a two-axis tilt sensor for providing additional compass information to the processor.

6. The navigation device as set forth in claim 5, wherein the processor calculates a heading of the device based upon the compass information provided by the three-axis magnetic sensor and the additional compass information provided by the two-axis tilt sensor.

7. A method of providing navigation information, the method comprising the steps of:
    (a) storing cartographic information, including altitude information;
    (b) receiving an input from a user identifying a first location and a second location;
    (c) creating an elevation profile of changes in elevation between the first location and the second location based upon the cartographic information without requiring the user to move from the first location to the second location; and
    (d) displaying the elevation profile.

8. The method as set forth in claim 7, wherein step (b) further includes determining a current location of the navigation device, and using the current location of the navigation device as the first location.

9. The method as set forth in claim 7, wherein step (b) further includes the step of determining a current altitude of the navigation device.

10. A navigation device comprising:
an input for receiving indication from a user of a first location and a second location;
a three-axis magnetic sensor for measuring a strength of earth magnetic field in three directions;
a two-axis tilt sensor for measuring an orientation of the navigation device in pitch and roll; and
a processor for creating an elevation profile of changes in elevation between the first location and the second location and for calculating a heading of the navigation device based on the strength of each magnetic field measured by the three-axis magnetic sensor and the two-axis tilt sensor.

11. The navigation device as set forth in claim 10, further including a memory for storing cartographic information including altitude information.

12. The navigation device as set forth in claim 10, further including a display for displaying the elevation profile and the heading.

13. The navigation device as set forth in claim 10, further including a GPS receiver for determining a current location of the navigation device, wherein the current location of the navigation device is used as the first location.

14. The navigation device as set forth in claim 10, further including an altimeter for determining a current altitude of the navigation device.

15. The navigation device as set forth in claim 10, further including a handheld portable housing for housing the magnetic sensor, the tilt sensor, and the processor.

16. The navigation device as set forth in claim 12, where the display presents a map which is scrollable by a user based on the calculated heading.

17. A navigation device comprising:
a three-axis magnetic sensor for measuring a strength of earth magnetic field in three directions;
a two-axis tilt sensor for measuring an orientation of the navigation device in pitch and roll;
a processor for calculating a heading of the navigation device based on the strength of each magnetic field measured by the three-axis magnetic sensor and the two-axis tilt sensor;
a display, coupled with the processor, for displaying a map; and
an input for allowing a user to scroll the displayed map based on the calculated heading.

18. The navigation device as set forth in claim 17, wherein the navigation device is operable to calculate the heading while the navigation device is stationary.

19. The navigation device of claim 18, wherein the navigation device allows the user to scroll the displayed map while the navigation device is stationary.

20. The navigation device of claim 18, further including a portable handheld housing for housing the magnetic sensor, the tilt sensor, the processor, and the display.

21. The navigation device of claim 17, further including a GPS receiver for determining the geographic location of the navigation device.

22. The navigation device of claim 21, wherein the geographic location of the navigation device is presented on the displayed map such that the user may scroll the displayed map based on the calculated heading in a direction corresponding to the geographic location of the navigation device.

* * * * *